(12) United States Patent
Schoon et al.

(10) Patent No.: US 7,141,745 B1
(45) Date of Patent: Nov. 28, 2006

(54) IN-LINE MAIL WEIGHING SYSTEM AND SCALE

(75) Inventors: Roy Schoon, Glenview, IL (US); Gary L. VanderSyde, Naperville, IL (US); David Schwaba, Chicago, IL (US); Mike Stollenwerck, Libertyville, IL (US); Eric Yadong Jin, Chicago, IL (US)

(73) Assignee: Bowe Bell +Howell Postal Systems Company, Wheeling, IL (US)

( * ) Notice: Subject to any disclaimer, the term of this patent is extended or adjusted under 35 U.S.C. 154(b) by 517 days.

(21) Appl. No.: 10/151,708

(22) Filed: May 17, 2002

(51) Int. Cl.
*G01G 19/00* (2006.01)
*G01G 19/40* (2006.01)
*G01G 23/00* (2006.01)

(52) U.S. Cl. .................... 177/25.15; 177/145; 705/407
(58) Field of Classification Search ............ 177/25.15, 177/145; 705/407
See application file for complete search history.

(56) References Cited

U.S. PATENT DOCUMENTS

| | | | |
|---|---|---|---|
| 4,137,568 A * | 1/1979 | Dlugos | 708/445 |
| 4,488,610 A * | 12/1984 | Yankloski | 177/4 |
| 4,956,782 A * | 9/1990 | Freeman et al. | 705/406 |
| 5,014,797 A * | 5/1991 | Dolan et al. | 177/4 |
| 5,094,306 A * | 3/1992 | Cohen et al. | 177/145 |
| 5,109,937 A * | 5/1992 | Kipp | 177/145 |
| 5,190,115 A * | 3/1993 | Dolan et al. | 177/25.15 |
| 5,723,825 A | 3/1998 | Manduley et al. | 177/145 |
| 5,726,393 A * | 3/1998 | Lyga | 177/25.15 |
| 6,107,579 A | 8/2000 | Kinnemann | 177/145 |
| 6,265,675 B1 * | 7/2001 | Hubler et al. | 177/25.15 |

FOREIGN PATENT DOCUMENTS

DE 199 22 881 A1 11/2000

\* cited by examiner

*Primary Examiner*—Randy W. Gibson
(74) *Attorney, Agent, or Firm*—McDermott Will & Emery LLP

(57) ABSTRACT

An in-line mail weighing system and scale comprises a mail piece transport mounted atop a load cell. The mail piece transport includes a drive assembly and a pressure assembly defining a transport path. Mail pieces are moved through the mail piece transport, on edge. The load cell takes a series of weight measurements for each mail piece in a stream of mail pieces as each mail piece moves through the mail piece transport at a constant high speed, and then accurately calculates the weight of each mail piece.

23 Claims, 4 Drawing Sheets

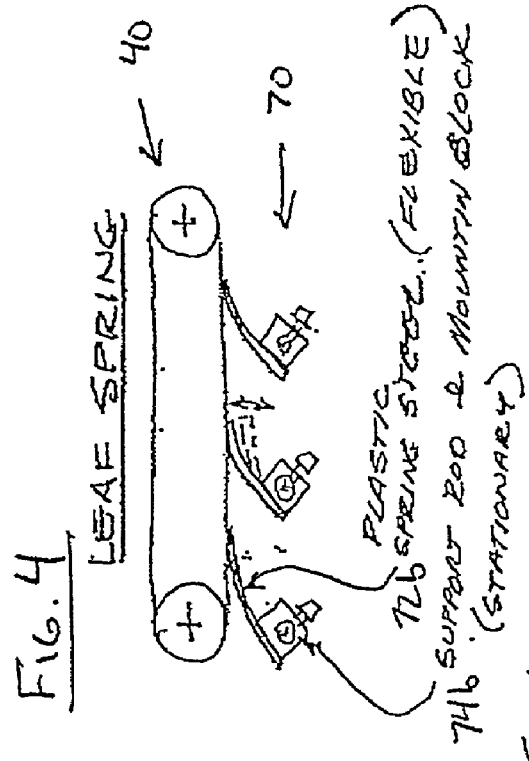
Fig. 3 TENSION BAR
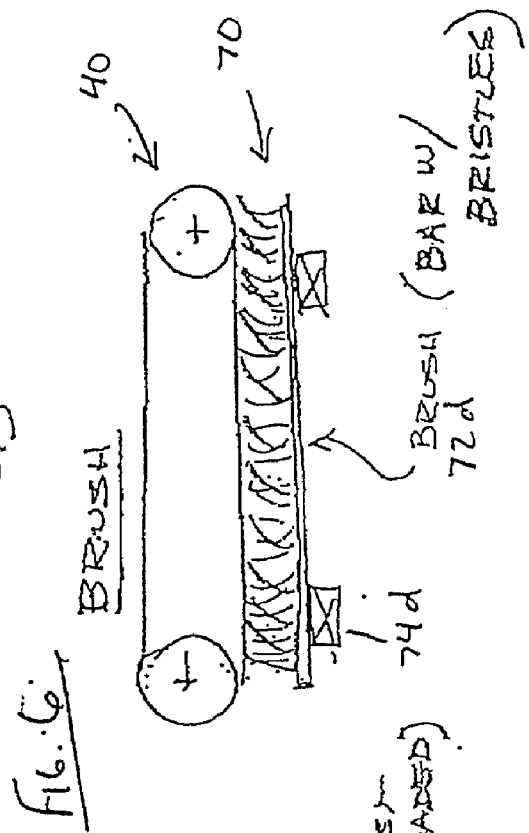
Fig. 4 LEAF SPRING
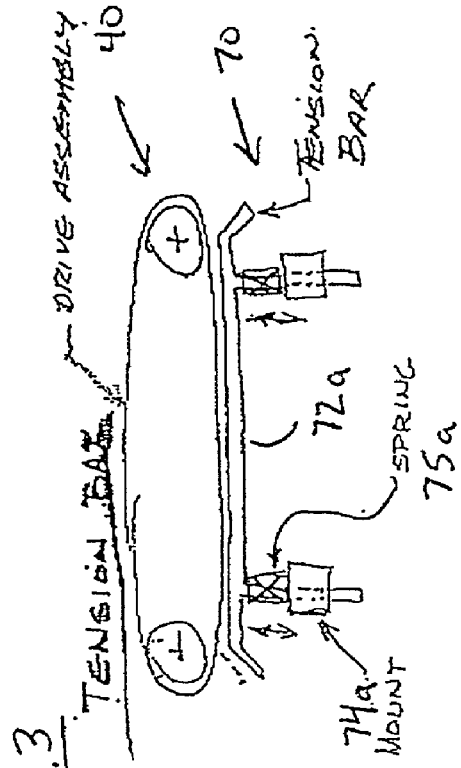
Fig. 5 PIVOTING IDLERS
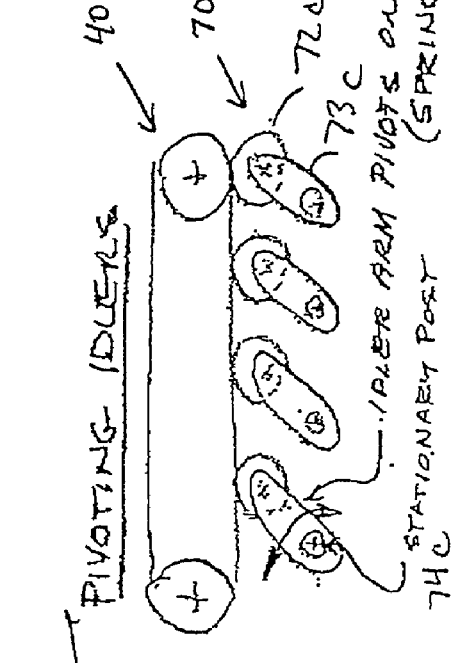
Fig. 6 BRUSH

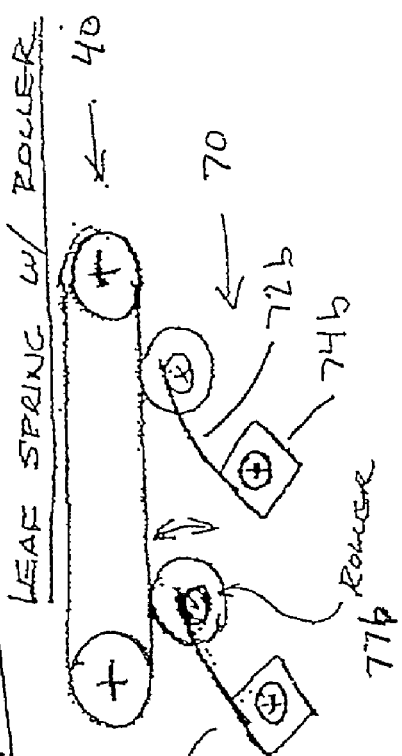
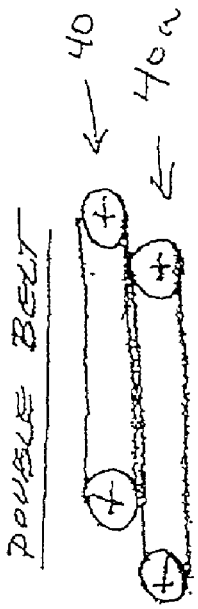
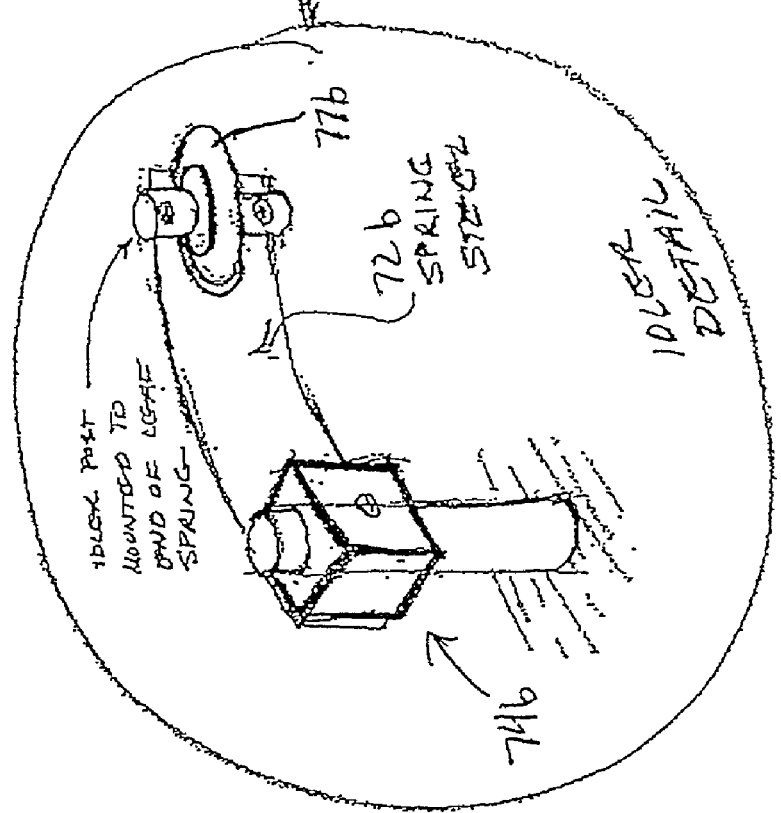

IN-LINE MAIL WEIGHING SYSTEM AND SCALE

The present invention relates to mail processing, and in particular to a mail weighing system and scale for mail processing machines. Specifically, the present invention relates to a high speed, in-line mail weighing system and scale for mail processing machines, such as sorting machines, inserters, etc.

BACKGROUND OF THE INVENTION

During the processing of mail, it is sometimes necessary or desired to weigh a mail piece for various reasons, such as to determine or verify postage amount. Mail pieces can be weighed on a scale apart from mail processing machines, although such a system is inefficient with respect to time and resources. Thus, it is desirable to weigh mail pieces during the processing in a mail processing machine. However, it has proven difficult to do so without affecting the speed of processing of the mail pieces, or the accuracy of the weight measurement.

Accordingly, there is a need for a mail weighing system and scale that can be used in mail processing equipment, in line, without affecting the speed of mail processing. There is also a need for such a mail weighing system and scale to be highly accurate. The present invention fulfills such needs.

BRIEF SUMMARY OF THE INVENTION

The present invention comprises an in-line mail weighing system and scale that is capable of weighing large numbers of mail pieces in succession in a fast and accurate manner. The mail weighing scale of the present invention comprises in general, a mail piece transport mounted on top of a load cell. As each mail piece is moved through the transport, a series of weight measurements of the transport with mail piece therein are taken by the load cell. A processor then computes the weight measurement of the mail piece based on the series of measurements.

The mail piece transport of the present invention comprises a scale plate, a drive belt assembly and a pressure assembly. The drive belt assembly and the pressure assembly are mounted opposite each other on the scale plate to define a mail piece transport path there between.

In use in a preferred embodiment, a mail piece enters the mail piece transport, standing on edge, and is propelled there through by the drive belt assembly. The pressure assembly applies slight pressure to the mail piece in order to hold the mail piece on edge and against the drive belt assembly. Mail pieces move through the mail piece transport one after another, at a constant speed. The present invention weighs each mail piece as it is moved through the transport. There is no need to stop or slow down the mail piece on the scale.

Accordingly, it is the principal object of the present invention to provide an in-line mail weighing system and scale for mail processing machines.

It is a further object of the present invention to provide an in-line mail weighing scale which successively measures a large number of mail pieces at a high and constant speed.

It is also an object of the invention to provide an in-line mail weighing scale which is highly accurate.

Numerous other advantages and features of the invention will become readily apparent from the detailed description of the preferred embodiment of the invention, from the claims and from the accompanying drawings in which like numerals are employed to designate like parts throughout the same.

BRIEF DESCRIPTION OF THE DRAWINGS

A fuller understanding of the foregoing may be had by reference to the accompanying drawings wherein:

FIGS. 3–7 are schematic top views of alternate embodiments of the pressure assembly of the present invention.
FIG. 8 is an enlarged perspective view of the pressure assembly of FIG. 7.
FIG. 9 is a schematic top view of an alternate embodiment of the mail piece transport of the present invention.

DETAILED DESCRIPTION OF THE PREFERRED EMBODIMENTS OF THE PRESENT INVENTION

Figure 1:
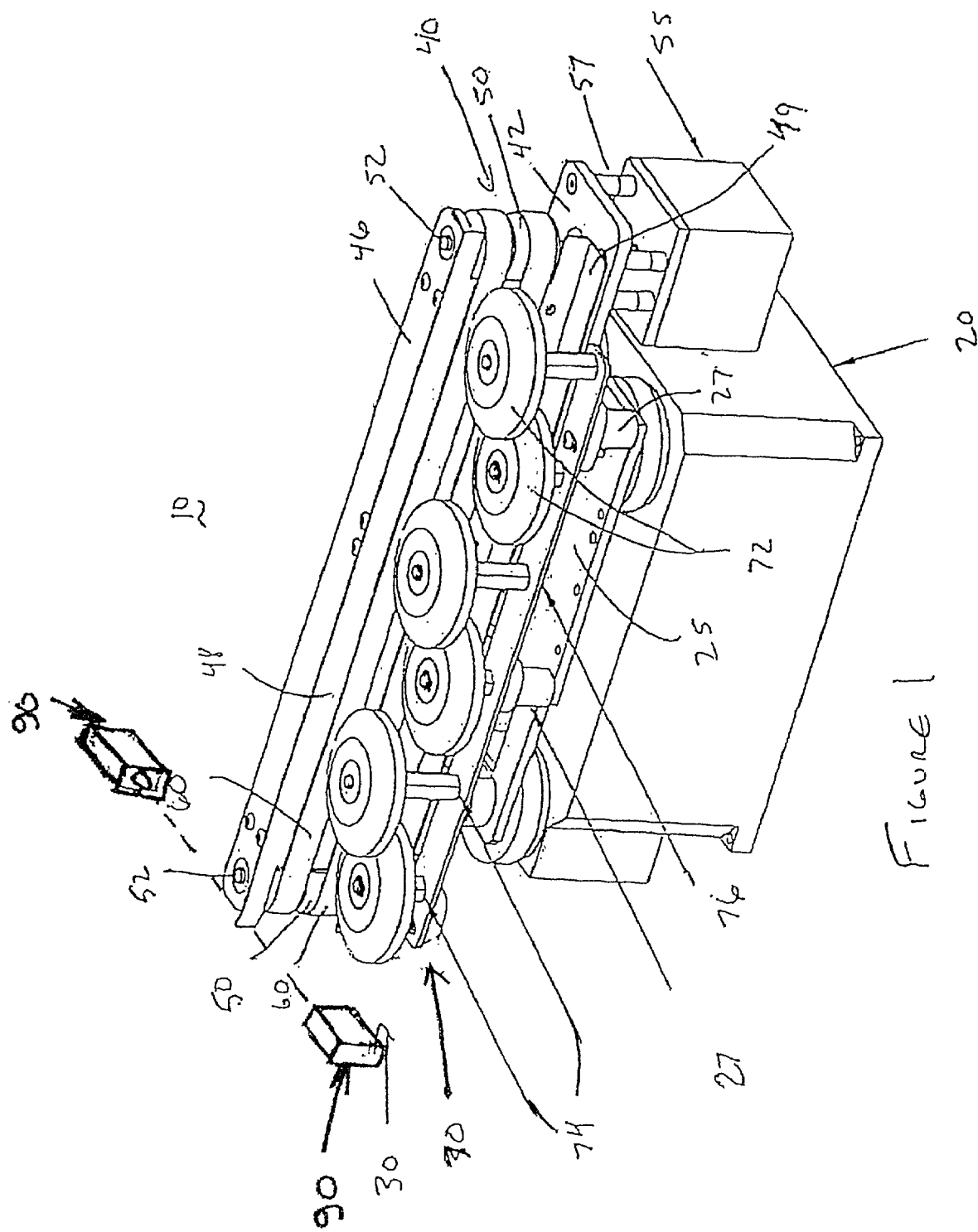
FIG. 1 is a front perspective view of the present invention.

While the invention is susceptible of embodiment in many different forms, there is shown in the drawings and will be described herein in detail a preferred and alternate embodiments of the present invention. It should be understood, however, that the present disclosure is to be considered an exemplification of the principles of the invention and is not intended to limit the spirit and scope of the invention and/or claims of the embodiments illustrated.

Figure 2:
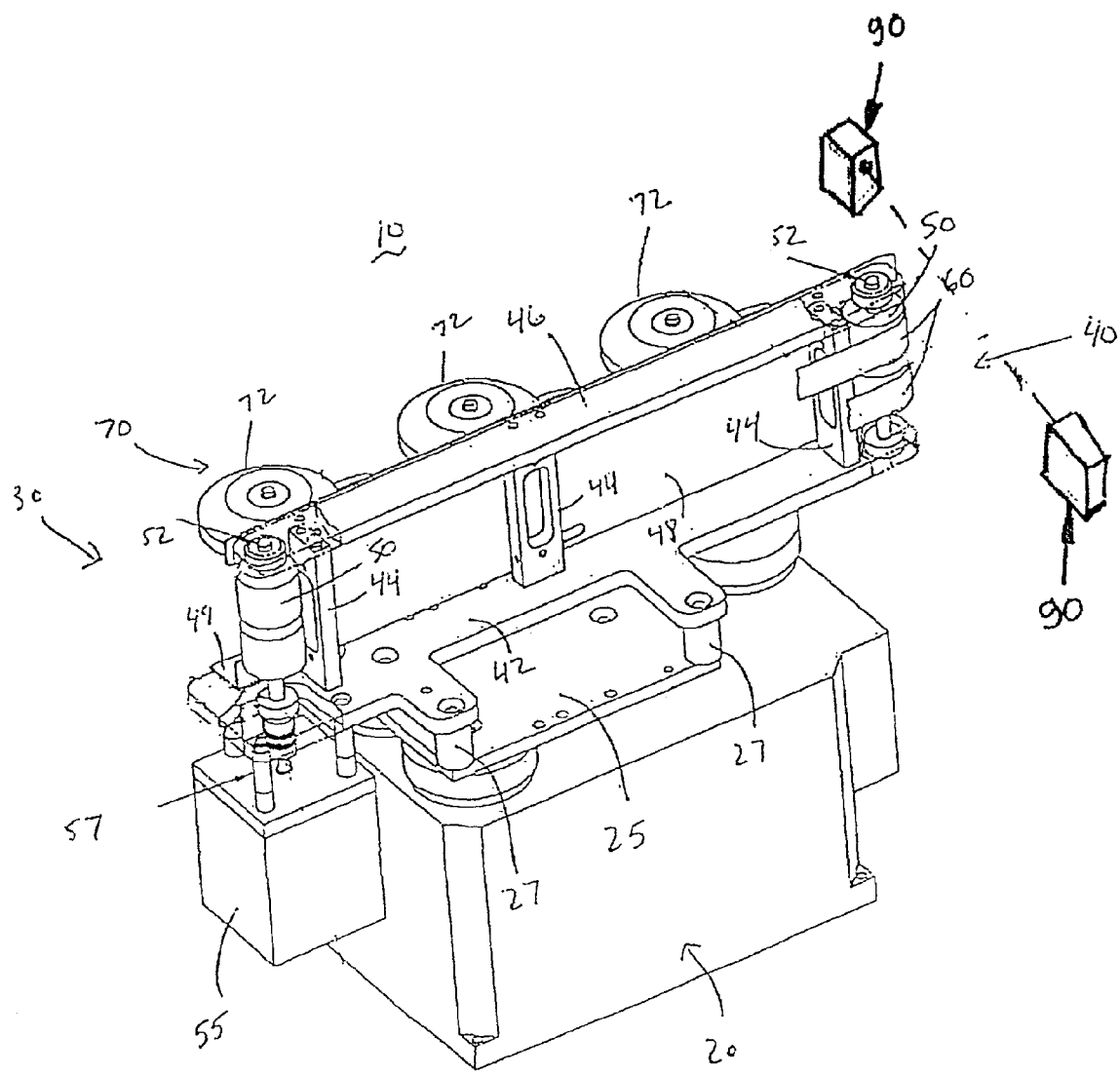
FIG. 2 is a back perspective view of the present invention.

FIGS. 1 and 2 illustrate a front perspective view and a back perspective view, respectively, of the present invention 10 comprising in general a load cell 20 on which a mail piece transport 30 is mounted. The mail piece transport 30 comprises a drive belt assembly 40 and a pressure assembly 70, illustrated as a roller assembly in FIGS. 1 and 2. Drive belt assembly 40 and pressure assembly 70 cooperate to move mail pieces, in an upright or on edge orientation, through mail piece transport 30, for weight measurement by load cell 20 as discussed in more detail below.

Drive belt assembly 40 includes a frame structure comprising a base plate 42, a plurality of spacer blocks 44, a top plate 46 and a side plate 48. Side plate 48 includes a perpendicular flange 49 along a lower portion thereof, which prevents the mail pieces from downward movement as they are moved through the mail piece transport 30. Base plate 42 is mounted atop a load cell mounting plate 25 via spacers 27.

At each of the ends of the frame structure of drive belt assembly 40 are mounted belt pulleys 50 around which drive belts 60 are mounted. Belt pulleys 50 are suitably mounted to rotatable shafts 52, which are in turn suitably mounted for rotation between base plate 42 and top plate 46. Drive belts 60 extend around belt pulleys 50, as well as side plate 48 and spacer blocks 44.

A motor 55 is operatively coupled to one of the shafts 52 to drive the associated belt pulleys 50 and, in turn, the drive belts 60. Motor 55 is preferably suitably mounted to base plate 42, via spacers 57 as illustrated. The motor 55 is preferably a low vibration motor.

Pressure assembly 70 is mounted in close proximity to drive belt assembly 40 and defines a mail piece transport path there between. As illustrated in FIGS. 1 and 2, pressure assembly 70 comprises a plurality of rollers 72, rotatably mounted on posts 74. Posts 74 are suitably mounted to a base plate 76, which in turn is mounted atop a load cell mounting plate 25 via spacers 27.

Any suitable number of rollers 72 are contemplated, however, in the preferred embodiment shown, six rollers 72 are arranged in a staggered pattern, wherein the height of the rollers 72 alternate between a low and a high setting, using posts 74 of differing lengths. In this manner, the edges of the rollers 72 can overlap. The lower rollers are preferably proximate the level of the lower drive belt and the upper rollers are preferably proximate the level of the upper drive belt. The rollers in such a configuration can provide better support and movement of the mail pieces through the mail piece transport 30.

Rollers 72 are preferably comprised of a compliant material, for example, a foam material. Thus, these rollers 72 constitute a slight pressure pad to hold the mail pieces against the drive belts 60. Also, the compliant rollers 72 have a resiliency to accommodate slight variations in mail piece thickness. Alternatively, the rollers 72 could be spring loaded or otherwise movably biased toward drive belt assembly 40, and allow for a slight deflection to accommodate variations in mail piece thickness.

The pressure assembly 70 of the present invention could take many forms, for example as shown in FIGS. 3–9. In FIG. 3, the pressure assembly 70 takes the form of a tension bar 72a mounted via suitable mounts 74a, and biased toward drive belt assembly 40 via springs 75a. In FIG. 4, the pressure assembly 70 takes the form of a plurality of leaf springs 72b mounted via suitable mounts 74b, e.g., a mounting block and support rod, such that the flexible leaf springs provide the bias toward drive belt assembly 40. In FIG. 5, the pressure assembly 70 takes the form of a plurality of pivoting idlers 72c biased toward drive belt assembly 40 via spring loaded idler arms 73c, which are mounted via suitable mounts 74c. In FIG. 6, the pressure assembly 70 takes the form of a brush 72d, comprising a bar with bristles, mounted via suitable mounts 74d, such that the bristles provide the bias toward drive belt assembly 40. In FIG. 7, the pressure assembly 70 takes the form of a plurality of leaf springs 72b mounted via suitable mounts 74b, e.g., a mounting block and support rod, as in FIG. 4, but further comprising a roller 77b suitably mounted to the end of the leaf spring 72b, as illustrated in FIG. 8.

FIG. 9 illustrates an alternate embodiment wherein the pressure assembly 70 takes the form of or is replaced with a second belt assembly 40a mounted in close proximity to the drive belt assembly 40, wherein one or both belt assemblies are driven to propel the mail pieces through the mail piece transport 30. It is also contemplated that a drive roller assembly comprising a plurality of rollers could replace the belt assemblies shown in FIGS. 1–7 and 9.

Accordingly, in use in a preferred embodiment, the present invention 10 is suitably located in line with a mail processing machine, such as for example, a mail sorter. Successive mail pieces are fed, on edge, into the mail piece transport 30 of the present invention at a high speed, in any known manner. It should be understood however, that the present invention is capable of weighing mail pieces at any orientation. For example, the mail piece transport could be rotated ninety degrees or set at a certain angle, etc. The mail pieces move between and are supported by the drive belts 60 and the rollers 72. The flange 49 of side plate 48 prevents each mail piece from undesired downward movement.

The drive belts 60 move the mail pieces through the mail piece transport 30. A sensor 90, located upstream of the weighing scale, is operatively connected to the load cell 20. The sensor 90 signals the load cell 20 to begin taking weight measurements after the mail piece has traveled a predetermined distance into the mail piece transport 30, providing for a settling time. The load cell will measure the weight of both the mail piece transport 30 and the mail piece. By knowing the weight of the mail piece transport 30, the load cell can determine the weight of the mail piece.

Preferably, the load cell 20 will take a series of measurements, for example nine, and then a processor in or connected to the load cell 20 will calculate the weight of the mail piece using a predetermined formula for averaging the series of measurements. In this manner, the in-line mail weighing system and scale of the present invention can accurately determine the weight of each mail piece in a stream of mail pieces. The mail pieces move through the mail piece transport 30 at a constant high speed. However, it should be understood that the present invention is capable of weighing mail pieces moving through the mail piece transport 30 at a variable speed, or in a stop and start manner.

The in-line mail weighing system and scale of the present invention is capable of determining the weight of each mail piece within 0.01 of an ounce, at a rate of approximately 14,000 mail pieces per hour.

It is to be understood that the embodiments herein described are merely illustrative of the principles of the present invention. Various modifications may be made by those skilled in the art without departing from the spirit or scope from the claims which follow. For example, it is foreseen that the drive belt assembly 40 and the roller assembly 70 could be interchanged so each is on the opposite side than as shown. Further modifications such as in the number, material and/or location of the pressure elements and drive belts are also contemplated.

What is claimed is:

1. A scale for weighing an object comprising:
   a load cell for measuring the weight of said object;
   a transport mounted to said load cell for moving said object across said load cell, the transport comprising a drive assembly and a pressure assembly displaceable in a direction generally perpendicular to the drive assembly and forcing the object into constant contact with the drive assembly;
   wherein said load cell determines the weight of said object as said transport moves said object across said load cell.

2. The scale of claim 1, wherein said object is a mail piece, and said transport moves said mail piece across said load cell on edge.

3. The scale of claim 2, wherein said scale is located in line with a mail processing machine.

4. The scale of claim 1, wherein said drive assembly comprises opposed pulleys and at least one drive belt around said pulleys.

5. The scale of claim 4, wherein said drive assembly further includes a side plate, said side plate having a flange for preventing downward movement of said object in said transport.

6. The scale of claim 1, wherein said pressure assembly comprises a plurality of rollers, a tension bar, a plurality of leaf springs, a plurality of pivoting idler rollers, a brush, a plurality of leaf springs with rollers, or a belt assembly.

7. The scale of claim 6, wherein said plurality of rollers are comprised of compliant foam material.

8. The scale of claim 1, wherein said drive assembly and said pressure assembly cooperate to support and move said object through said transport.

9. The scale of claim 1, wherein said transport includes a sensor to activate said load cell when said object trips said sensor.

10. A mail weighing system for successively weighing a plurality of mail pieces comprising:

a load cell for taking weight measurements of said mail pieces;

a mail piece transport mounted to said load cell for moving said mail pieces across said load cell in series, the mail piece transport comprising a drive assembly and a pressure assembly displaceable relative to the drive assembly and exerting a biasing force on the mail pieces toward the drive assembly and forcing the mail pieces into constant contact with the drive assembly;

wherein said load cell determines the weight of each of said plurality of mail pieces as said mail piece transport moves each of said mail pieces on edge across said load cell at a constant speed.

11. The mail weighing system of claim 10, wherein said mail weighing system is located in line with a mail processing machine.

12. The mail weighing system of claim 10, wherein said drive assembly comprises opposed pulleys and at least one drive belt around said pulleys, and said pressure assembly comprises a plurality of rollers.

13. The scale of claim 12, wherein said drive assembly and said pressure assembly define a mail transport path therebetween, and cooperate to support and move said mail pieces through said mail piece transport.

14. The mail weighing system of claim 12, wherein said drive assembly further includes a side plate, said side plate having a flange for preventing downward movement of said mail pieces in said mail piece transport.

15. A mail weighing system for successively weighing a plurality of mail pieces comprising:
   a load cell for taking weight measurements of the mail pieces;
   a mail piece transport mounted to the load cell for moving the mail pieces across the load cell in series, the mail piece transport comprising a drive assembly and a pressure assembly having a plurality of rollers;
   wherein the load cell determines the weight of each of the plurality of mail pieces as the mail piece transport moves each of the mail pieces on edge across said load cell; and
   wherein said plurality of rollers are configured in a staggered fashion.

16. The mail weighing system of claim 12, wherein said plurality of rollers are comprised of compliant material.

17. The mail weighing system of claim 10, wherein said mail weighing system includes a sensor to activate said load cell at a predetermined time after a mail piece trips said sensor.

18. A method of weighing a series of mail pieces in line with a mail processing machine, said method comprising the steps of:
   aligning a mail piece weighing scale in line with said mail processing machine;
   defining a mail piece transport path between a drive assembly and a pressure assembly on said mail piece weighing scale, wherein the pressure assembly is displaceable relative to the drive assembly;
   feeding said series of mail pieces on edge, into said mail piece transport path between said drive assembly and said pressure assembly;
   pushing the mail piece into constant contact with the drive assembly via the pressure assembly; and
   taking at least one weight measurement of said mail piece as it is transported through said mail piece transport path.

19. The method of claim 18, further comprising the step of:
   sensing the presence of a mail piece entering said mail piece transport path via a sensor located at a predetermined location upstream of said mail piece weighing scale; and
   commencing the step of taking at least one weight measurement at a predetermined time after the step of sensing.

20. The method of claim 18, wherein the step of taking at least one weight measurement includes taking a series of weight measurements, and processing the series of weight measurements to determine the weight of the mail piece.

21. The method of claim 20, wherein the step of feeding and the step of taking at least one weight measurement occur at a rate of approximately 14,000 mail pieces per hour.

22. The method of claim 21, wherein the weight of the mail piece is accurately determined within 0.01 of an ounce.

23. The scale of claim 8, wherein the pressure assembly resiliently accommodates mail pieces of varying thickness.

* * * * *